June 23, 1959 W. C. MORRO, JR., ET AL 2,891,633
ACETYLENE SEPARATION SYSTEM
Filed Sept. 26, 1956 2 Sheets-Sheet 1
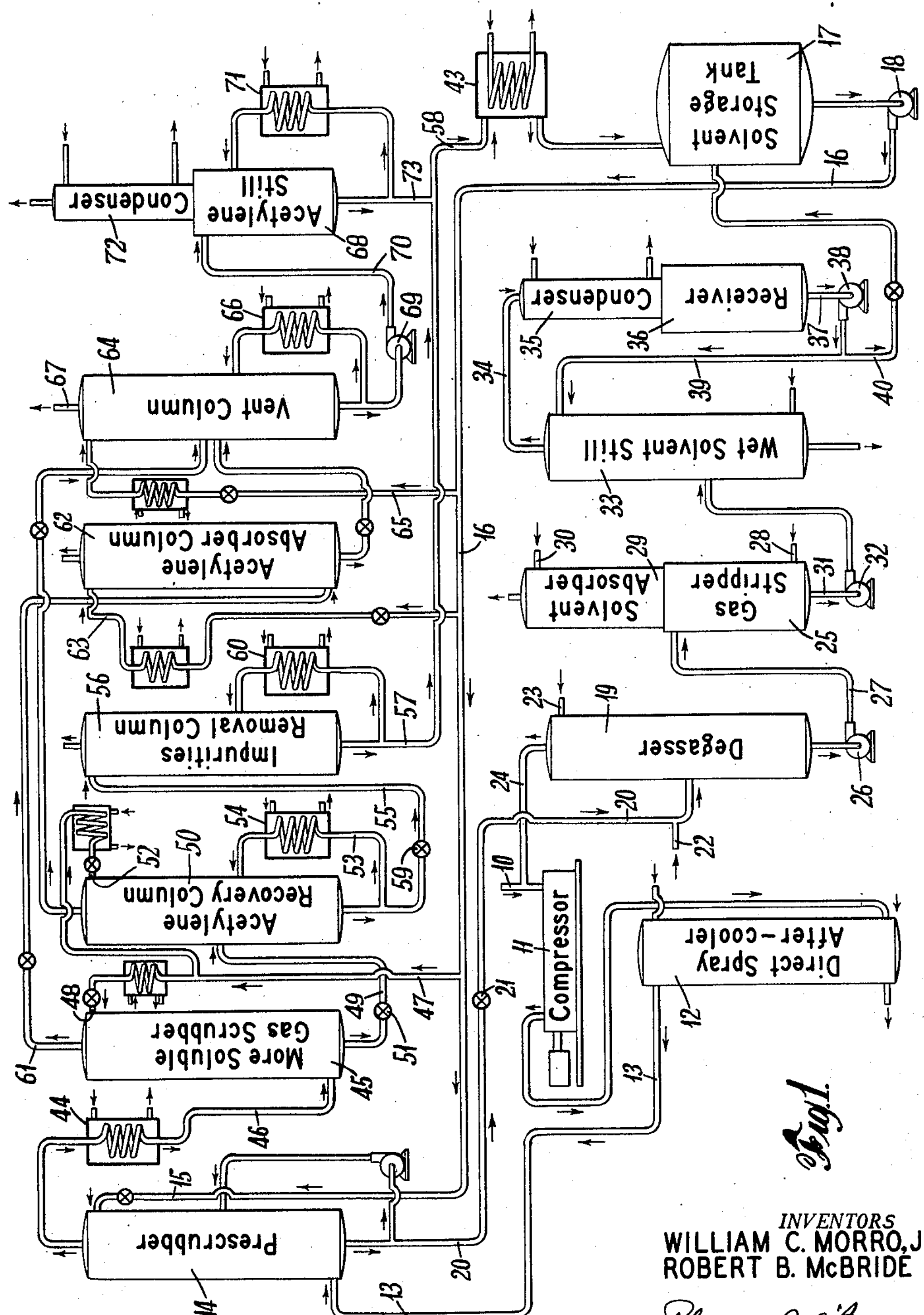
INVENTORS
WILLIAM C. MORRO, JR.
ROBERT B. McBRIDE
BY Thomas J. O'Brien
ATTORNEY June 23, 1959 W. C. MORRO, JR., ET AL 2,891,633
ACETYLENE SEPARATION SYSTEM
Filed Sept. 26, 1956 2 Sheets-Sheet 2
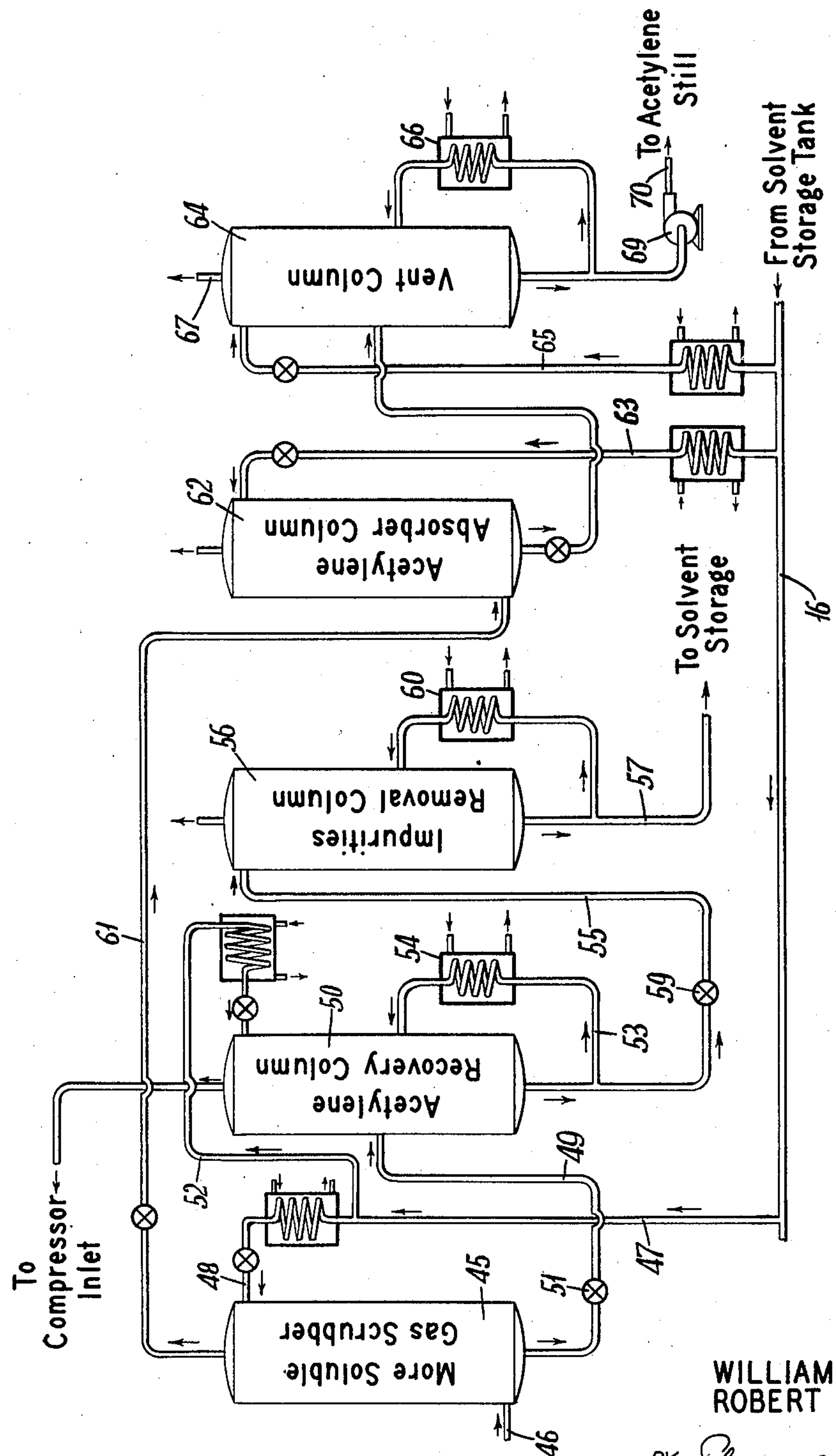
INVENTORS
WILLIAM C. MORRO, JR.
ROBERT B. McBRIDE
BY Thomas D. O'Brien
ATTORNEY United States Patent Office 2,891,633

Patented June 23, 1959

2,891,633

ACETYLENE SEPARATION SYSTEM

William C. Morro, Jr., Charleston, W. Va., and Robert B. McBride, Houston, Tex., assignors to Union Carbide Corporation, a corporation of New York Application September 26, 1956, Serial No. 612,298

10 Claims. (Cl. 183—115)

This invention relates to a process for recovering acetylene in a gas stream resulting from a partial oxidation of a hydrocarbon. More particularly, this invention is concerned with an improved process for separating acetylene from such a gas stream by selective absorption in a solvent.

In the production of acetylene from hydrocarbons; for example, by partial oxidation of natural gas, a product-gas stream is formed in which the acetylene yield is contained as a minor constituent in a mixture of several other gases. While it is possible to remove substantially all of the impurities from the acetylene product, the recovery of high purity acetylene from such gas mixture has been exceedingly difficult to achieve without excessive separating costs. Consequently, in order to obtain a product that is competitive with acetylene produced from calcium carbide, it has been necessary to compromise product purity to hold separating costs at a reasonable level.

It is an object of this invention to provide a more efficient method of separating acetylene in a high state of purity from a product-gas stream resulting from hydrocarbon acetylene processes. More particularly, the present invention provides a process for separating and purifying acetylene from a product-gas stream, resulting from a partial oxidation of natural gas, which provides savings in operating and investment costs and which provides improved product purity while also reducing solvent requirements.

A further object of this invention is to provide an improved system for separating high purity acetylene from such a product-gas stream, which requires only a single solvent and provides for efficient recovery of the solvent.

In accordance with the general principles of this invention, the acetylene-containing product-gas stream, which has been produced from a hydrocarbon and which has been subjected to preliminary treatment including compression to a desired pressure, is treated with a water-miscible acetylene solvent to three principal selective absorptions. In the first selective absorption, the product-gas stream is scrubbed with the small amount of solvent just sufficient for the absorption of all the diacetylene and other heavier impurities some of which are potentially polymerizable to solids. This confines all cleaning problems attendant to solids deposition to the initial section of equipment and leaves the remaining sections of the system, which constitute the major portion thereof, uncontaminated over extended periods of operation. The furnace gas stream is then washed with an amount of additional solvent sufficient for the removal substantially of all the constituents more soluble than acetylene; viz. methyl and vinyl acetylenes and a large portion of the contained allene (propadiene). Some of the contained acetylene is also dissolved in the solvent and is later recovered therefrom while holding the higher acetylenes in solution. The stream of liquid solvent containing the more soluble impurities is then treated to strip the absorbed components therefrom so as to recover the solvent for re-use in the system. The remainder of the furnace gas stream is then washed with an amount of additional solvent sufficient to remove the acetylene from the gases less soluble than acetylene. The stream of acetylene recovered from the solvent containing the more soluble gases and the stream of solvent containing in solution the acetylene separated from the main part of the less soluble gases are further treated to strip out residual less soluble impurities such as hydrogen, methane, carbon monoxide and carbon dioxide, and product acteylene is then recovered from solvent by stripping with heat.

A special feature of this invention lies in the step of removing the methyl and vinyl acetylenes and allene from the product gas stream prior to the saparation of the acetylene from the less soluble impurities. It has been found that by scrubbing the product gas stream at a temperature near or below the condensation point of the impurities at the partial pressure of these impurities in the system, but still quite far from the actual condensation temperature of the acetylene at the partial pressure of this material in the system, the preferential solubility of the solvent for such contaminants is increased many times over what it otherwise is and an almost complete removal of these contaminant gases can be achieved with a relatively low solvent rate and with a minimum absorption of acetylene. This step provides improved product purity control, particularly from the standpoint of allene removal efficiency. Allene is one of the two usual impurities (carbon dioxide being the other) whose solubility most nearly approaches that of acetylene and which is therefore very difficult to remove. Consequently, the efficiency of allene removal is one of the principal factors in determining product purity. The step also provides increased savings by reducing the amount of solvent that needs to be circulated through the system. The very large differential obtained in the solubility between components to be separated allows the higher acetylenes and allene to be separated from the product gas stream with much less solvent than what would be otherwise required. This reduces costs involved in treating and circulating solvent. Moreover, the separation is achieved with a single solvent, which in itself simplifies solvent handling and recovery.

These and other objects, features and advantages of the invention will become more apparent from the following detailed description of the drawing in which:

Fig. 1 shows an exemplary flow diagram of a system in which the principles of the present invention may be practiced; and Fig. 2 shows a fragmentary flow diagram of a modification of the system of Fig. 1.

With reference to the drawing, an acetylene-containing stream of reaction gas products obtained from a treatment of a hydrocarbon, for example, by the partial oxidation of methane, is led by a conduit 10 to a compressor 11 where the gas is compressed to a predetermined pressure which is as high as possible while maintaining the gas mixture below explosive limits. Where the explosive limits are not known, the partial pressure of acetylene may be maintained at about one atmosphere. The stream of compressed gas mixture is then passed to an after-cooler 12, from which it leaves in a condition ready for the separation process.

The compressed reaction gases are delivered first by way of a conduit 13 to the bottom of a prescrubbing column 14 where the gases are scrubbed with a small stream of solvent to remove all the diacetylene, benzene, cyclopentadiene, water vapor and all other heavy impurities that might be present in the reaction product gases in trace quantities. The solvent is introduced into the prescrubber 14 by a branch conduit 15 leading from a header 16 into which solvent is delivered from a storage tank 17 by a pump 18. It is very important that these heavy impurities be completely removed from reaction product gases prior to the main separation and purification because some of them, notably diacetylene, tend to form undesirable polymers with resultant solids deposition. By preliminary prescrubbing of the product gas stream, the cleaning problems attendant to solids deposition are confined to the prescrubbing and solvent purification section of the separation process, and the rest of the equipment, which constitutes the major portion of the separation process, may be expected to remain clean over a period of years.

The liquid from the base of the pre-scrubbing column 14 contains a minor amount of acetylene as well as the impurities mentioned above. This liquid is delivered to a degasser 19 through conduit 20 where the dissolved acetylene is recovered by lowering the solubility of the acetylene in the mixture. To this end, the pressure of the stream is reduced by passage through throttling valve 21 in conduit 20 and by the introduction of water into the stream in conduit 20 as at 22 to dilute the solvent. Additional water is introduced into the top of the degasser, as indicated at 23, to wash solvent vapor out of the evolved gas. The released acetylene, which also contains small quantities of some of the impurities, is returned through conduit 24 to the main reaction gas stream at the inlet of compressor 11 for reprocessing.

The water-solvent mixture from the base of the degasser 19 is passed to a gas stripper 25 by a pump 26 in conduit 27. An inert stripping gas, such as methane, is introduced at 28 to strip the dissolved impurities out of solution. The stripping gas, together with the evolved impurities, then passes upwardly through a solvent absorber 29 which acts in conjunction with the gas stripper 25 as a single column since the water that is introduced into the top of the absorber, as at 30, to wash solvent from the stripping gas, passes downwardly into the stripper 25 and acts to further dilute the solvent and reduce the solubility of the impurity gases. The stripping gas and impurity gases are discharged from the top of the absorber as waste, and the stripped water-solvent mixture is fed by conduit 31 and pump 32 therein to a wet solvent still 33 in which the water and solvent are separated by fractional distillation. The still is operated by introducing steam into the kettle liquid to boil off the solvent. The effluent solvent is passed by way of conduit 34 to the top of a condenser 35 and the condensed liquid is collected in a receiver 36, from which it is fed by conduit 37 to a pump 38, the liquid being pumped partly to the top of the still by way of conduit 39 for use as reflux liquid and partly by way of conduit 40 to the solvent storage tank 17. The still product in tank 17 is then recycled as part of the solvent through the system. Waste liquid in the kettle of still 33 is drained to a sewer.

The overhead gas from the prescrubber 14 is cooled in a heat exchanger 44 and is then fed to the bottom of a second scrubbing tower 45 by conduit 46 for the removal of the impurities that are more soluble than acetylene. The scrubbing column 45 is operated at a column base temperature in the range of from —20° C. to —40° C. The higher acetylenes and allene, which under normal temperature conditions are slightly more soluble than acetylene, have been found to be many times as soluble as acetylene at these temperatures. The gas stream entering column 45 is scrubbed with a relatively small flow of solvent introduced into the top of the column, as by branch conduits 47 and 48 leading from header 16, in a sufficient proportion at these temperatures to remove all of the methyl and vinyl acetylene and a substantial amount of the contained allene. The scrubbing in column 45 results in part of the acetylene being dissolved. The latter must be separated from the solvent in order that the loss of acetylene associated with the removal of the higher acetylenes and allene be held to a minimum. For this purpose the solvent containing the impurities and some of the acetylene is passed through a conduit 49 to an acetylene recovery column 50, the pressure of the liquid stream being reduced considerably by passage through a throttling valve 51 in conduit 49. An additional volume of solvent from header 16 is introduced into the top of the acetylene recovery column by branch conduits 47 and 52 to serve as reflux for scrubbing methyl acetylene, vinyl acetylene and allene from the acetylene gas which is stripped from the solvent by said pressure reduction and by heating such solvent in the kettle at the bottom of column 50. The liquid solvent in the kettle of the column is heated by circulating a stream of liquid from the bottom of the column through a conduit 53 which passes through a heat exchanger 54 wherein the liquid stream may be heated by a suitable medium, such as steam, before being returned to the column.

The liquid from the base of the acetylene recovery column 50, which contains virtually all the methyl and vinyl acetylene and a substantial portion of the allene, is delivered by conduit 55 to an impurities removal column 56 where the solvent is stripped of all dissolved gases and is returned by way of conduit 57, conduit 58 and cooler 43 to solvent storage tank 17 for recirculation through the system. The impurities removal column, 56 is operated at a lower pressure than the recovery column pressure reduction being effected in a throttle valve 59 in the impurities column feed line 55. Kettle liquid in the impurities removal column is heated by a steam-heated heat exchanger 60. This heating serves to strip the dissolved gases from the solvent. The evolved gases which pass out of the top of the impurities column are cooled, water scrubbed for solvent recovery and then disposed of as waste.

The overhead from the scrubbing column 45 is fed by conduit 61 to the main acetylene absorbing column 62 wherein the remaining contained acetylene in the partially purified reaction gases is now separated from the less soluble impurities by absorption in the same solvent as used above. This column is operated at a high pressure slightly below the pressure used in the scrubbing column 45 and at a temperature of approximately —20° C. A sufficient proportion of solvent is introduced into the top of column 62 by branch conduit 63 leading from header 16 to dissolve all the remaining acetylene in the reaction product stream. The effluent from the acetylene absorber column 62 contains nearly all the hydrogen, methane, carbon monoxide, a substantial portion of carbon dioxide and substantially all of the remaining less soluble impurities.

As shown in Fig. 1, the liquid in the base of the acetylene absorber 62, which is a solvent-acetylene mixture, and the overhead from the acetylene recovery column 50, which comprises principally acetylene, are delivered to the vent column 64 near the mid-point of the column. Alternatively, the overhead from the acetylene recovery column 50 can be returned to the compressor suction for re-processing, as shown in Fig. 2, and the feed to the vent column 64 will be from the acetylene absorber column. The vent column 64 is operated at a relatively low pressure so the feed from the absorber 62 is throttled prior to delivery into the column while the recovery column 50 operates only slightly above the vent column pressure. Additional solvent is introduced into the top of the vent column by branch conduit 65 leading from header 16 to scrub acetylene out of the gas rising above the feed points. The only impurities in the feeds entering the vent column, with the exception of a small quantity of allene, are those which are less soluble than acetylene and they are principally hydrogen, methane, carbon monoxide and carbon dioxide. The vent column kettle liquid temperature is controlled by means of a steam-heated heat exchanger 66 located externally to the column in order to strip all gases except acetylene out of solution. These gases pass upwardly and out of the vent column as effluent at 67. The vent column tails liquid is pumped to an acetylene still 68 by pump 69 in conduit 70. The acetylene is there recovered from the solvent by stripping with heat. A steam-heated heat exchanger 71 is provided for heating the liquid in the still to drive the acetylene out of solution. The evolved acetylene passes out of the system through a condenser 72 wherein most of the solvent vapor is condensed. The solvent is returned by way of conduit 73, conduit 58 and cooler 43 to the solvent storage tank 17.

An acetylene product of at least 99.2 percent purity can be produced continuously by the described process with an acetylene recovery of about 94 to 96 percent of the acetylene fed to the separation from the partial oxidation reaction. Solvent losses are held to less than .04 percent of the total used daily.

Although acetone is preferred as the solvent, the invention is not limited to the use thereof, as any solvents which are capable of dissolving acetylene more selectively than other constituent gases and which are miscible in water, are suitable for the practice of this invention. These include, for example, methyl ethyl ketone, butyro lactone, dimethylformamide and methanol.

The following is given as an example of the invention using acetone as the solvent. A stream of pre-treated reaction gases resulting from the partial oxidation of natural gas, compressed to 240 p.s.i.g. and cooled to 35° C., is washed in the pre-scrubbing column 14 with a stream of acetone in a proportion of about 1.1 gallons of acetone per 1000 cubic feet of reaction gases. This scrubbing removes all the diacetylene, benzene, cyclopentadiene, water vapor and all other heavy impurities present, together with about 43 percent of the vinyl acetylene, 16 percent of the methyl acetylene and about 2.4 percent of the acetylene contained in the reaction gas stream. To minimize acetylene loss, the pre-scrubber tails liquid is treated in the degassing column 19 to strip acetylene from solution in the solvent. To this end, the pressure on the liquid is reduced to about 5 p.s.i.g. and the liquid is diluted with about 1.1 gallons of water per gallon of liquid prior to delivery into a midpoint of the degasser so as to reduce the solubility of the dissolved gases. Approximately half of the dissolved acetylene, together with about 5 percent of the diacetylene, is released from solution. The evolved gases are contacted with approximately .4 gallon of additional water per gallon of liquid to wash down acetone vapor and are then recycled to the reaction gas stream at the compressor inlet.

The remaining dissolved gases are then stripped from the diluted solvent liquid in the gas stripper 25 by adding methane to the base of the column in approximate ratio of 55 cubic feet per gallon of prescrubber tails liquid. In the acetone absorber 29, about 4 gallons of water per gallon of prescrubber tails liquid is added as reflux to wash acetone out of the evolved gases. The acetone is then recovered from the residual water-acetone mixture by distillation and is conditioned for recycling in the system.

All the contained methyl and vinyl acetylene and approximately 70 percent of the contained allene are then removed from the partially purified stream of reaction gases leaving the top of the pre-scrubbing column 14. This is accomplished by cooling the stream to a temperature between —20° C. and —30° C. The reaction gases are scrubbed in column 45 by acetone at a temperature between —20° C. and —30° C., preferably —30° C. and at a reflux rate of about 3.0 gallons per 1000 cubic feet of pre-scrubbed reaction gas. Approximately 40 percent of the contained acetylene becomes dissolved in the scrubbing liquid and in order to recover this acetylene, the tails liquid from column 45 is throttled to a lower pressure and passed to a mid-point of a rectifying stripper 50 wherein the liquid at the base or "kettle" of the column is heated to about 90° C. to drive acetylene out of the kettle liquid and wherein additional solvent liquid is introduced into the top of the column at a temperature of about 0° C. to serve as reflux for washing methyl acetylene, vinyl acetylene and allene out of gases rising above the feed point of the liquid from column 45. With a solvent feed of about 4.5 gallons per 1000 cubic feet of pre-scrubbed furnace gas, approximately 93 percent of the acetylene is recovered from solution and all the vinyl acetylene, all the methyl acetylene and 75 percent of the allene in the scrubber tails liquid is contained in the kettle liquid. These impurities can then be stripped from the acetone solvent by reducing the pressure on the tails liquid of the rectifying stripper or impurities removal column 50 and heating the tails liquid sufficiently (to about 650 C.) to drive all the dissolved gases out of solution. Most of the acetone vaper evolved can be recovered by condensation and then water scrubbed for acetone recovery in the solvent purification unit.

The reaction gas stream passing out of the top of column 45 now contains about 60 percent of the acetylene and impurities less soluble than acetylene. The latter is now separated from these impurities by contacting the stream with approximately 14.8 gallons of acetone per 1000 cubic feet of feed gas in the acetylene absorber column 62, the acetone being at a temperature of —22° C. and the column being operated at a pressure of about 200 p.s.i.g. The acetone dissolves approximately 99 percent of the acetylene contained in the feed gas, only about 35 percent of the carbon dioxide and minor amounts of the other impurities. Most of the carbon dioxide and other impurities, together with some acetone vapor, pass out of the top of the acetylene absorbing column. Most of the effluent acetone vapor may be recovered by condensation.

The acetylene-containing acetone from the acetylene absorber 62 is warmed to about 25° C. and together with the acetylene effluent from the acetylene recovery column 50 is then treated to strip all gases except acetylene out of solution. For this purpose these acetylene containing streams are introduced into vent column 64 at a mid-point thereof. The liquid at the base of the column is heated to a temperature of about 63° C. and the evolved gases are contacted with additional acetone at a temperature of about 0° C. to wash acetylene out of the rising gases. The volume of this additional acetone is about 13.5 gallons per 1000 cubic feet of prescrubbed furnace gas. The effluent stream contains substantially all the impurities except for traces of allene and carbon dioxide, plus some acetone vapor which may be recovered by condensation. The acetone-acetylene mixture is then treated in an acetylene still to separate the product acetylene from the acetone; the latter may be then cooled for recirculation in the system. The product has the following composition:

| Component: | Vol. percent |
|---|---|
| Carbon dioxide | 0.5 |
| Acetylene | 99.5 |
| Allene | 0.2 |
| | 100.0 |

The foregoing example illustrates feed rates for obtaining a product of specific purity. For this purpose, high ratios of solvent feed to charge stream were employed in the scrubber 45 and the acetylene recovery column 50 to obtain a low allene content in the product and a high ratio of solvent feed to charge stream was employed in the vent column 44 to obtain a relatively low carbon dioxide content in the product. These feeds can be adjusted selectively to determine allene and carbon dioxide content in the product and, hence, product purity. A second example is given below to illustrate feed rates when a lower purity product is satisfactory. Acetone is also the solvent base, and the acetylene recovered from the scrubber tails liquid is reprocessed with the main furnace gas stream.

A stream of pre-treated reaction gases compressed to 190 p.s.i.g. and cooled to 35° C. is washed in the pre-scrubbing column 14 with a stream of acetone in a proportion of about 1.1 gallons of acetone per 1000 cubic feet of reaction gases. This scrubbing removes all the diacetylene, benzene, cyclopentadiene, water vapor and all other heavy impurities present, together with about 35 percent of the vinyl acetylene, 13 percent of the methyl acetylene and about 2.0 percent of the acetylene contained in the reaction gas stream. To minimize acetylene loss the pre-scrubber tails liquid is treated in the degassing column 19 to strip acetylene from solution in the solvent. To this end, the pressure on the liquid is reduced to about 5 p.s.i.g. and the liquid is diluted with 1.1 gallons of water per gallon of liquid prior to delivery into a midpoint of the degasser 19 so as to reduce the solubility of the dissolved gases. Approximately half of the dissolved acetylene, together with about 5 percent of the diacetylene, is released from solution. The evolved gases are contacted with approximately .4 gallon of additional water per gallon of liquid to wash down acetone vapor and are then recycled to the reaction gas stream at the compressor inlet.

The remaining dissolved gases are then stripped from the diluted solvent liquid in the gas stripper by adding methane to the base of the column in approximate ratio of 55 cubic feet per gallon of prescrubber tails liquid. Approximately 4 gallons of water per gallon of pre-scrubber tails liquid is added as reflux to wash acetone out of the evolved gases. The acetone is then recovered from the residual water-acetone mixture by distillation and is conditioned for recycling in the system.

All the contained methyl and vinyl acetylene and approximately 30 percent of the contained allene are then removed from the partially purified stream of reaction gases leaving the top of the pre-scrubbing column 14. This is accomplished by cooling the stream to a temperature between −30° C. and −40° C. The reaction gases are scrubbed in column 45 by acetone at a temperature between −30° C. and −40° C., and at a reflux rate of 0.8 gallon per 1000 cubic feet of pre-scrubbed reaction gas. Approximately 18 percent of the contained acetylene becomes dissolved in the scrubbing liquid and in order to recover this acetylene, the tails liquid from column 45 is throttled to a lower pressure and passed to a midpoint of a rectifying stripper 50 wherein the liquid at the base or "kettle" of the column is heated to about 87° C. to drive acetylene out of the kettle liquid and wherein additional solvent liquid is introduced into the top of the column at a temperature of about 0° C. to serve as reflux for washing methyl acetylene, vinyl acetylene and allene out of gases rising above the feed point of the liquid from column 45. The acetylene effluent from recovery column 50 is returned to compressor suction for re-processing as shown in Fig. 2 of the drawings. With a solvent feed of 3.0 gallons per 1000 cubic feet of pre-scrubbed furnace gas, approximately 93 percent of the acetylene is recovered from solution and all the vinyl acetylene, all of the methyl acetylene and 75 percent of the allene in the scrubber tails liquid is contained in the kettle liquid. These impurities are then stripped from the acetone solvent by reducing the pressure on the tails liquid of the rectifying stripper 50 and heating the tails liquid sufficiently (to about 65° C.) to drive all the dissolved gases out of solution. Most of the acetone vapor evolved is recovered by condensation and then scrubbing with water in the solvent absorber of the solvent purification unit.

The reaction gas stream passing out of the top of column 45 now contains about 82 percent of the acetylene and impurities less soluble than acetylene. The latter is now separated from these impurities by contacting the stream with approximately 24.0 gallons of acetone per 1000 cubic feet of feed gas in the acetylene absorber column 62, the acetone being at a temperature of 0° C. and the column being operated at a pressure of about 155 p.s.i.g. The acetone dissolves approximately 99 percent of the acetylene contained in the feed gas, only about 35 percent of the carbon dioxide and minor amounts of the other impurities. Most of the carbon dioxide and other impurities, together with some acetone vapor, pass out of the top of the acetylene absorbing column. Most of the effluent acetone vapor may be recovered by condensation.

The acetylene-containing acetone from the acetylene absorber 62 is warmed to about 25° C. and is then treated to strip all gases except acetylene out of solution. For this purpose this acetylene-containing stream is introduced into vent column 64 at mid-point thereof. The liquid at the base of the column is heated at a temperature of about 70° C. and the evolved gases are contacted with additional acetone at a temperature of about 0° C. to wash acetylene out of the rising gases. The volume of this additional acetone is about 9.0 gallons per 1000 cubic feet of prescrubbed furnace gas. The effluent stream contains substantially all the impurities except for traces of allene and carbon dioxide, plus some acetone vapor which may be recovered by condensation. The acetone-acetylene mixture is then treated in an acetylene still to separate the product acetylene from the acetone; the latter may be then cooled for recirculation in the system. The product has the following composition:

| Component: | Vol. percent |
|---|---|
| Carbon dioxide | 1.0 |
| Acetylene | 98.7 |
| Allene | 0.3 |
| | 100.0 |

It will be understood that the new features of process operation herein disclosed and set forth in the appended claims may be employed in ways and forms different from those of the preferred embodiments described above and illustrated in the drawings without departing from the scope of the invention.

We claim:

1. A process for the separation of acetylene from a gas stream containing acetylene in low concentration and produced by partial oxidation of a hydrocarbon, which comprises contacting said gas stream under pressure with an acetylene solvent in a quantity sufficient for the absorption of diacetylene and aromatic hydrocarbon impurities contained in the stream; cooling said stream to a temperature near the condensation points at their partial pressures of the gases slightly more soluble than acetylene; scrubbing said gas stream with an acetylene solvent at about the same temperature with sufficient amount to absorb all the gases in the stream more soluble than acetylene; washing the scrubbed gas stream with sufficient acetylene solvent to absorb all the acetylene from the less soluble gases contained in the stream; stripping substantially all the remaining portions of less soluble gases from the acetylene-solvent mixture by rectification; and thereafter recovering the make acetylene from the acetylene-solvent mixture by heating the mixture to strip the solvent therefrom.

2. A process as defined in claim 1, wherein said solvent is a solvent selected from the group consisting of methanol, dimethylformamide, methyl ethyl ketone, butyro lactone and acetone.

3. A process for the separation of acetylene from a gas stream containing acetylene in low concentration and produced by partial oxidation of a hydrocarbon, which comprises contacting said gas stream under pressure with an acetylene solvent, selected from the group consisting of methanol, dimethylformamide, methyl ethyl ketone, butyro lactone and acetone, in a quantity sufficient for the absorption of diacetylene and aromatic hydrocarbon impurities contained in the stream; cooling said stream to a temperature near the condensation points at their partial pressures of the gases slightly more soluble than acetylene; scrubbing said gas stream with additional solvent at about such temperature with sufficient amount to absorb all the gases in the stream more soluble than acetylene; separating acetylene dissolved during such scrubbing from the more soluble impurities dissolved in the solvent to form a stream of acetylene-containing material, washing the scrubbed gas stream with sufficient solvent at a temperature not substantially above said scrubbing temperature to absorb all the acetylene from the less soluble gases contained in the stream to form another stream of acetylene-containing material; then passing at least part of said acetylene-containing material to a rectification in which the material is heated to drive off remaining portions of less soluble gases and in which the evolved gases are contacted by liquid solvent to wash any evolved acetylene out of the effluent gases; and thereafter recovering the make acetylene from the acetylene-solvent mixture by heating the mixture to strip solvent therefrom.

4. A process for recovering acetylene from a gas stream containing acetylene in low concentration and produced by partial oxidation of a hydrocarbon, which comprises contacting said gas stream under pressure with an acetylene solvent, selected from the group consisting of methanol, dimethylformamide, methyl ethyl ketone, butyro lactone and acetone, in a quantity sufficient for the absorption of diacetylene and aromatic hydrocarbon impurities contained in said stream; cooling said stream to a temperature near the condensation points at their partial pressures of the gases slightly more soluble than acetylene; scrubbing said gas stream with additional solvent at about such temperature with a sufficient amount at such temperature to absorb all the gases in the stream more soluble than acetylene; separating acetylene dissolved during such scrubbing from the more soluble impurities dissolved in the solvent to form an acetylene-containing stream; washing the scrubbed gas stream at a temperature not substantially above said scrubbing temperature with sufficient additional solvent to absorb all the acetylene from the less soluble gases contained in the stream to form another acetylene-containing stream; then stripping substantially all the remaining portions of the less soluble gases from the acetylene-containing streams by passing such streams to a rectification in which liquid is heated to drive such gases out of solution and in which evolved gases are contacted by additional solvent to wash any evolved acetylene out of effluent gases; and thereafter recovering the product acetylene from the acetylene-solvent mixture by heating the mixture to strip the solvent therefrom.

5. A process for the separation of acetylene from a gas stream containing acetylene in a low concentration and produced by partial oxidation of a hydrocarbon, which comprises compressing said gas stream; contacting such gas stream under pressure with an acetylene solvent, selected from the group consisting of methanol, dimethylformamide, methyl ethyl ketone, butyro lactone and acetone, in a quantity sufficient for the absorption of diacetylene and aromatic hydrocarbon impurities contained in the stream; cooling said stream to a temperature near the condensation points at their partial pressure of the gases slightly more soluble than acetylene; scrubbing said gas stream with additional solvent at about such scrubbing temperature with sufficient amount at such temperature to absorb all the gases in the stream more soluble than acetylene; recovering acetylene dissolved during such scrubbing from the more soluble impurities dissolved in the solvent and returning such acetylene to said gas stream prior to compression; washing the scrubbed gas stream at a temperature slightly above said scrubbing temperature with sufficient solvent to absorb all the acetylene from the less soluble gases contained in the stream; then stripping substantially all the remaining portions of less soluble gases from the acetylene-solvent mixture by passing such mixture to a rectification in which the mixture is heated to drive such gases out of solution and in which evolved gases are contacted by additional solvent to wash any evolved acetylene out of effluent gases; and thereafter recovering the product acetylene from the acetylene-solvent mixture by heating the mixture to strip the solvent therefrom.

6. A process for the separation of acetylene from a gas stream containing acetylene in low concentration and produced by partial oxidation of a hydrocarbon, which comprises compressing said gas stream to a pressure as high as permissible while maintaining the gas mixture out of explosive range; contacting said gas stream under pressure with acetone in a quantity just sufficient for the absorption of diacetylene and aromatic hydrocarbon impurities contained in said stream; cooling said stream to between about −20° C. to −40° C.; scrubbing said gas stream with additional acetone at a temperature between about −20° C. and −40° C. in a sufficient amount to absorb all the gases in the stream more soluble than acetylene; separating acetylene dissolved during such scrubbing from the more soluble impurities dissolved in the acetone to form a stream of acetylene-containing material; washing the scrubbed gas stream at a temperature not substantially above said scrubbing temperature with sufficient acetone to absorb all the acetylene from the less soluble gases contained in the stream to form another of acetylene-containing material; then passing at least part of said acetylene-containing material to a rectification in which the material is heated to drive off remaining portions of less soluble gases out of solution and in which evolved gases are contacted by liquid acetone to wash any evolved acetylene out of the effluent gases; and thereafter recovering the product acetylene from the acetylene-acetone mixture by heating the mixture to strip acetone therefrom.

7. A process for recovering acetylene as defined in claim 6, which includes varying the acetone to feed gas ratio in said scrubbing and acetylene separating steps directly according to the degree of allene removal required.

8. A process for recovering acetylene as defined in claim 6, which includes varying the acetone to rising vapor ratio in said stripping step directly according to the degree of carbon dioxide removal required.

9. A process for recovering acetylene from a gas stream containing acetylene in a concentration of less than 10 percent by volume and produced by partial oxidation of a hydrocarbon, which comprises compressing said gas stream to a pressure not less than 15 atmospheres while maintaining the gas mixture out of explosion range; contacting such gas stream with acetone in a quantity just sufficient for the absorption of diacetylene and aromatic hydrocarbon impurities contained in the stream; cooling said stream to about −30° C.; scrubbing said gas stream with additional acetone at a temperature of about −30° C. with sufficient amount to absorb all the gases in the stream more soluble than acetylene; separating acetylene dissolved during such scrubbing from the more soluble impurities dissolved in the acetone to form a stream of acetylene-containing material; washing the scrubbed gas stream at a temperature slightly above said scrubbing temperature with sufficient acetone to absorb all the acetylene from the less soluble gases contained in the stream to form another stream of acetylene-containing material; then passing at least part of said acetylene-containing material to a rectification in which the material is heated to drive off remaining portions of less soluble gases out of solution and in which evolved gases are contacted with liquid acetone to wash any evolved acetylene out of the effluent gases; and thereafter recovering the product acetylene from the acetylene-acetone mixture by heating the mixture to strip acetone therefrom.

10. A process for the separation of acetylene from a gas containing acetylene in low concentration and produced by partial oxidation of a hydrocarbon, which comprises contacting said gas stream under pressure with an acetylene solvent, selected from the group consisting of methanol, dimethylformamide, methyl ethyl ketone, butyro lactone and acetone, in a limited quantity approximately just sufficient for the absorption of diacetylene and aromatic hydrocarbon impurities contained in the stream; cooling said stream to between about −20° C. to −40° C.; scrubbing said gas stream with additional acetylene solvent at a temperature between about −20° C. to −40° C. in a quantity approximately just sufficient to absorb the gases in the stream more soluble than acetylene including methyl and vinyl acetylenes; separating the acetylene dissolved during such scrubbing from the more soluble impurities dissolved in the solvent to form a stream of acetylene-containing material; washing the scrubbed gas stream at a temperature not substantially above said scrubbing temperature with sufficient solvent to absorb all the acetylene from the less soluble gases contained in the stream to form another stream of acetylene-containing material; then passing at least part of said acetylene-containing material to a rectification in which the material is heated to drive off the remaining portions of less soluble gases out of solution and in which evolved gases are contacted by liquid solvent to wash any evolved acetylene out of the effluent gases; and thereafter recovering the product acetylene from the acetylene-solvent mixture by heating the mixture to strip solvent therefrom.

References Cited in the file of this patent

UNITED STATES PATENTS

| | | |
|---|---|---|
| 2,217,429 | Balcar | Oct. 8, 1940 |
| 2,714,940 | Milligan | Aug. 9, 1955 |
| 2,726,734 | Nirenberg | Dec. 13, 1955 |
| 2,741,332 | Finneran et al. | Apr. 10, 1956 |

UNITED STATES PATENT OFFICE

CERTIFICATE OF CORRECTION

June 23, 1959

Patent No. 2,891,633

William C. Morro, Jr., et al

It is hereby certified that error appears in the printed specification of the above numbered patent requiring correction and that the said Letters Patent should read as corrected below.

Column 6, line 14, for "650 C." read -- 65° C. --.

Signed and sealed this 22nd day of March 1960.

(SEAL)
Attest:

KARL H. AXLINE
Attesting Officer

ROBERT C. WATSON
Commissioner of Patents